(12) United States Patent
Koyama et al.

(10) Patent No.: US 6,844,053 B2
(45) Date of Patent: Jan. 18, 2005

(54) ACRYLIC RESIN FILM AND INJECTION MOLDED ARTICLE USING THE SAME

(75) Inventors: Koji Koyama, Niihama (JP); Kazuhiro Yokoo, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/315,104

(22) Filed: Dec. 10, 2002

(65) Prior Publication Data

US 2003/0125465 A1 Jul. 3, 2003

(30) Foreign Application Priority Data

Dec. 14, 2001 (JP) .......................................... 2001-381111

(51) Int. Cl.$^7$ .......................... B32B 27/30; B29C 45/14; C08J 5/18; C08L 33/12
(52) U.S. Cl. ....................... 428/220; 428/327; 428/332; 428/517; 428/520; 428/521; 428/522
(58) Field of Search ................................. 428/219, 220, 428/327, 332, 517, 520, 521, 522

(56) References Cited

U.S. PATENT DOCUMENTS

| | | | |
|---|---|---|---|
| 4,545,752 A | 10/1985 | Hanamoto et al. | |
| 6,444,298 B1 * | 9/2002 | Tadokoro et al. | ........... 428/213 |

FOREIGN PATENT DOCUMENTS

| | | |
|---|---|---|
| JP | 4-9647 B2 | 2/1992 |
| JP | 6-179794 A | 6/1994 |
| JP | 7-9484 A | 1/1995 |

* cited by examiner

Primary Examiner—D. S. Nakarani
(74) Attorney, Agent, or Firm—Sughrue Mion, PLLC

(57) ABSTRACT

An acrylic resin film, a laminate film comprising the acrylic resin film and a thermoplastic resin layer placed on one surface of the acrylic resin film, and an injection molded article using the acrylic resin film are provided. The acrylic resin film laminate film have little white turbidity even if being heated in molding and maintains excellent design properties, and the injection molded article having the acrylic resin film on its surface is excellent in design properties such as color depth.

13 Claims, No Drawings

ACRYLIC RESIN FILM AND INJECTION MOLDED ARTICLE USING THE SAME

FIELD OF THE INVENTION

The present invention relates to an acrylic resin film, a laminate film comprising the acrylic resin film and a thermoplastic resin layer placed on one surface of the acrylic resin film, and an injection molded article using the acrylic resin film.

BACKGROUND OF THE INVENTION

Conventionally, molded articles obtained by injection molding have been widely used for automobile interiors, domestic electric appliance exteriors and the like. In order to decorate such molded articles, for example, a technique named as a simultaneous injection molding and lamination method has been employed. The simultaneous injection molding and lamination method includes a method comprising the steps of inserting a decorated resin film between a male and a female dies for injection molding and injecting a melting resin from one side of the dies so as to form an injection molded article and paste the resin film simultaneously onto the molded article; a method comprising the steps of preliminarily molding a decorated resin film or a laminate film having the decorated film on one surface of another film by vacuum molding and then inserting the preliminarily molded film into an injection molding die, or preliminarily molding a decorated resin film or a laminate film having the decorated film in one surface of another film by vacuum molding, compressed air molding or the like in an injection molding die, and then injecting a melting resin to the die so as to integrally mold the preliminarily molded film with the resin. The latter method, that is, a method comprising the steps of preliminarily molding a film or a laminate film and then injecting a melting resin onto one surface of the film, is also called an insert molding method. Such a simultaneous injection molding and lamination methods are described in, for example, Japanese Patent Application Publication (JP-B) No. 63-6339, JP-B No. 4-9647, Japanese Patent Application Laid-Open (JP-A) No. 7-9484 and the like.

An acrylic resin film is preferably employed for such simultaneous injection molding and lamination methods since the film is excellent in weathering resistance, good surface luster, surface hardness and surface smoothness.

In the simultaneous injection molding and lamination method, a resin film to be a surface layer is generally subjected to heating at 100° C. or higher. When a conventional acrylic resin film is used for the surface layer in this method, there is problems such that the roughness of the film surface is increased by such heating and the resulting film tends to have white turbidity to deteriorate design properties of the film. It has been, therefore, needed to solve the problem.

SUMMARY OF THE INVENTION

Inventors of the present invention have enthusiastically made investigations to develop an acrylic resin film which has little white turbidity even if being heated at the time of molding and maintains excellent design properties. As a result, the present inventors have found that a film in which two types of rubber particles with different average particle diameters are dispersed in a methacrylic resin has little white turbidity even if being heated in molding and maintains excellent design properties, and that a laminate film using the film is suitable for a variety of molding methods and that an injection molded article having the film on its surface is excellent in design properties such as color depth. The present invention has been consequently completed based on the above findings.

The present invention provides an acrylic resin film having a thickness of about 500 $\mu$m or thinner and comprising 50 parts by weight to 95 parts by weight of a methacrylic resin as a mother phase, 2.5 parts by weight to 20 parts by weight of a first rubber particle with an average particle diameter of 0.2 $\mu$m to 0.4 $\mu$m and 2.5 parts by weight to 30 parts by weight of a second rubber particle with an average particle diameter of 0.18 $\mu$m or smaller, both particles being dispersed in the mother phase. The film may be colored.

The acrylic resin film may be utilized in a laminate film wherein at least one layer of a thermoplastic resin is placed onto the acrylic resin film. Thus, the present invention provides a laminate film comprising the above-described acrylic resin and at least one layer of a thermoplastic resin placed on one surface of the acrylic resin film.

The acrylic resin film and the laminate film are useful as a film to be used as a surface layer of an injection molded article, especially in a simultaneous injection molding and lamination method. Thus, the present invention also provides a film for a simultaneous injection molding and lamination method, the film comprising the above-described acrylic resin film or laminate film. Moreover, the present invention provides an injection molded article comprising the above-described acrylic resin film (for simultaneous injection molding and lamination method) and a thermoplastic resin layer, wherein the film is united in the surface of the thermoplastic resin layer in an injection molding.

DESCRIPTION OF THE INVENTION

In the present invention, two types of rubber particles are used with a methacrylic resin. The methacrylic resin may be a homopolymer of a methacrylic acid ester and/or a copolymer of the methacrylic acid ester as a main component.

The methacrylic acid ester may be a methacrylic acid alkyl ester having an alkyl group with carbons in number of 1 to 4. When the methacrylic resin is a copolymer, a monomer to be used together with the methacrylic resin for producing the copolymer may be an acrylic acid ester (which is well known as an advantageous copolymerization component for a methacrylic resin), an aromatic vinyl compound and a vinyl cyanide compound.

Preferably, a methacrylic resin in the present invention is a methacrylic resin which is obtainable by polymerization of monomers comprising 50% by weight to 100% by weight of a methacrylic acid alkyl ester having alkyl group with 1 to 4 carbons, 0 to 50% by weight of an acrylic acid ester and 0 to 49% by weight of at least one of other vinyl monomers co-polymerizable with the methacrylic acid alkyl ester and the acrylic acid ester. More preferably, the methacrylic resin is a resin which is obtainable by polymerization of monomers comprising 0.1% by weight to 50% by weight of the acrylic acid ester and/or 50% by weight to 99.9% by weight of the methacrylic acid alkyl ester. Incidentally, in this specification, when the term is simply written "monomer", it means not only one of monomers but also means a plurality of monomers in mixed state.

The methacrylic resin may be one kind of methacrylic resin or may be a mixture of two or more kinds of methacrylic resins.

Examples of the methacrylic acid alkyl ester include a methyl methacrylate, an ethyl methacrylate, a butyl methacrylate and the like. Among them, a methyl methacrylate is especially preferably used. The acrylic acid ester may be an alkyl ester, and examples of the acrylic acid ester include a methyl acrylate, an ethyl acrylate, a butyl acrylate and the like. Other vinyl monomers copolymerizable with the methacrylic acid alkyl ester and/or acrylic acid ester may be a variety of monomers which are conventionally well known in this field, and examples of such vinyl monomers include an aromatic vinyl compound and a vinyl cyanide compounds.

Further, a methacrylic resin in the present invention preferably has a glass transition temperature of 40° C. or higher, and more preferably has a glass transition temperature of 60° C. or higher. When the methacrylic resin with a glass transition temperature of lower than 40° C. is used, the heat resistance of the resulting film tends to be lowered, undesirably. The glass transition temperature can be properly controlled by changing the types and the amounts of monomers other than the methacrylic acid alkyl ester, which are copolymerized with the methacrylic acid alkyl ester. Since the glass transition temperature of a homopolymer of a methyl methacrylate is about 106° C., when a methyl methacrylate is used as the methacrylic acid alkyl ester, the resulting methacrylic resin may have a glass transition temperature of about 106° C. or lower.

A polymerization method for producing the above-described methacrylic resin is not particularly limited, and may be a suspension polymerization method, an emulsion polymerization method, a bulk polymerization method and the like. In order to obtain a proper glass transition temperature or in order to obtain a proper viscosity for moldability to be a film, a chain-transferring agent is preferably used in the polymerization. The amount of the chain-transferring agent to be used may be determined properly depending on the type and the composition of the monomers for the polymerization.

In the present invention, two types of rubber particles are contained in a methacrylic resin. One of rubber particles has an average particle diameter of 0.2 μm to 0.4 μm and the other one of rubber particles has an average particle diameter of 0.18 μm or smaller. The first rubber particle preferably has an average particle diameter of 0.2 μm to 0.3 μm. The second rubber particle preferably has an average particle diameter of 0.12 μm to 0.18 μm.

When the first rubber particle has an average particle diameter of larger than 0.4 μm, the transparency of the resulting film may deteriorate. On the other hand, when the first rubber particle has an average particle diameter of smaller than 0.2 μm (which means both first and second rubber particles have average particle diameters of smaller than 0.2 μm), the impact resistance of the resulting film containing the two types of rubber particles in the above-described amounts tends to become low, which may provide a fragile film. When the second rubber particle has an average particle diameter of larger than 0.18 μm (which means both of the first and second rubber particles have average particle diameters of larger than 0.18 μm), the resulting film tends to have white turbidity in molding and heating, which may deteriorate design properties. When the second rubber particle has an average particle diameter of 0.12 μm to 0.18 μm, the impact resistance of the resulting film is more improved.

The first and second rubber particles may be obtained from the same kinds of monomers or may be obtained from the different kinds of monomers from each other.

The first and second rubber particles are rubber particles which are respectively obtainable by a method comprising the steps of polymerizing monomers consisting of 50% by weight to 99.9% by weight of acrylic acid alkyl ester, 0 to 49.9% by weight of at least one of other vinyl monomers copolymerizable with the acrylic acid alkyl ester and 0.1% by weight to 10% by weight of a copolymerizable cross-linking monomer to obtain an elastic copolymer; and polymerizing 10 parts by weight to 400 parts by weight of monomers consisting of 50% by weight to 100% by weight of a methacrylic acid ester, 0 to 50% by weight of an acrylic acid ester and 0 to 49% by weight of at least one of other vinyl monomers copolymerizable with the methacrylic acid ester and the acrylic acid ester in the presence of 100 parts by weight of the elastic copolymer so that at least one layer obtained from the latter polymerization is bonded with the surface of the elastic copolymer. By changing the polymerization conditions, the particles with different average particle diameters can be produced.

The first and second rubber particles may be produced by polymerizing the above-described monomers for the elastic copolymer by at least one step reaction in an emulsion method or the like to obtain the elastic copolymer and then polymerizing the above-described monomers mainly containing a methacrylic acid ester by at least one step reaction in an emulsion method or the like in the presence of the elastic copolymer. By such polymerization with a plurality of steps, the monomers mainly containing a methacrylic acid ester to be used in the latter step is graft-copolymerized with the elastic copolymer to produce across-linked elastic copolymer having graft chains. Thus-obtained rubber particles are graft copolymers having a multilayer structure which is obtained from an acrylic acid alkyl ester as a main component for rubber. The polymerization for the elastic copolymer and/or the successive polymerization thereon using the monomers mainly containing a methacrylic acid ester may be carried out in two or more steps, respectively, as long as the resulting rubber particles comprises the monomers in the amounts within the above-mentioned ranges as a whole, rather than in the respective steps.

Examples of the acrylic acid alkyl esters to be used for the elastic copolymer in the rubber particles include an acrylic acid ester having an alkyl group with 1 to 8 carbons. Among them, it is preferred to use an acrylic acid alkyl ester having an alkyl group with 4 to 8 carbons, such as a butyl acrylate and a 2-ethylhexyl acrylate.

Examples of other vinyl monomers to be optionally used for the elastic copolymer in the rubber particles and to be copolymerizable with the acrylic acid alkyl ester include a methacrylic acid alkyl ester such as a methyl methacrylate, a butyl methacrylate and a cyclohexyl methacrylate, a styrene and an acrylonitrile.

The copolymerizable cross-linking monomers to be used for the elastic copolymer in the rubber particles may include a monomer having at least two polymeric carbon-carbon double bonds in its molecule. Examples of the copolymerizable cross-linking monomer include an unsaturated carboxylic acid diester of glycol such as an ethylene glycol dimethacrylate and a butanediol dimethacrylate; an unsaturated carboxylic acid alkenyl ester such as an allyl acrylate, an allyl methacrylate and an allyl sinnamate; a polycarboxylic acid polyalkenyl ester such as a diallyl phthalate, a diallyl maleate, a triallyl cyanurate and a triallyl isocyanurate; an unsaturated carboxylic acid polyhydric alcohol ester such as a trimethylolpropane triacrylate; a divinylbenzene and the like. Among them, it is preferred to use an unsaturated carboxylic acid alkenyl ester and a polycarboxylic acid polyalkenyl ester. These cross-linking monomers may be used solely, or two or more of them may be used in combination thereof.

Onto the elastic copolymer obtained by polymerization of monomers mainly containing an acrylic acid alkyl ester, may be graft-polymerized monomers comprising 50% by weight to 100% by weight of a methacrylic acid ester, 0 to 50% by weight of an acrylic acid ester and 0 to 49% by weight of at least one of other vinyl monomers copolymerizable with the methacrylic acid ester and/or the acrylic acid ester. Examples of the methacrylic acid ester to be graft-polymerized with the elastic copolymer include a methacrylic acid alkyl ester such as a methyl methacrylate, an ethyl methacrylate, a butyl methacrylate, a 2-ethylhexyl methacrylate, a cyclohexyl methacrylate. Examples of the acrylic acid ester include an acrylic acid alkyl ester such as a methyl acrylate, a butyl acrylate and cyclohexyl acrylate. The other vinyl monomers copolymerizable with the methacrylic acid ester and/or the acrylic acid ester is not particularly limited, and examples thereof include a styrene, an acrylonitrile and the like.

The amounts of monomers to be graft-polymerized with the elastic copolymer may be 10 parts by weight to 400 parts by weight and is preferably 20 parts by weight to 200 parts by weight, based on 100parts by weight of the elastic copolymer. The graft-polymerization may be conducted in at least one step reaction. When the amount of the monomers to be graft-polymerized is 10 parts by weight or more, coagulation of the elastic copolymer hardly occurs, and therefore, transparency of the resulting film becomes excellent.

The rubber particles in the present invention may have a hard polymer layer obtained mainly from a methacrylic acid ester in the inside of the above-mentioned elastic copolymer. Such rubber particles may be produced by a method in which monomers for the hard polymer layer (innermost layer) are polymerized to obtain the hard polymer, then the monomers for the elastic copolymer are polymerized in the presence of the hard polymer to obtain the elastic copolymer, and then the monomers mainly containing a methacrylic acid ester are graft-polymerized onto the obtained elastic copolymer.

Preferably, the hard polymer for the innermost layer is obtained by polymerization of monomers comprising 70% by weight to 100% by weight of a methacrylic acid ester and 0 to 30% by weight of other vinyl monomer copolymerizable with the methacrylic acid ester. When the other vinyl monomers are used, it is effective to use a copolymerizable cross-linking monomer as one of other vinyl monomers. The methacrylic acid ester for the innermost layer may be a methacrylic acid alkyl ester, and is preferably a methyl methacrylate. The rubber particles with a three-layer structure having such an innermost hard layer are described, for example, in JP-B No. 55-27576 (=U.S. Pat. No. 3,793,402). Especially, the particle disclosed in Example 3 of the publication is one of preferable particles.

In the present invention, the first and second rubber particles provide excellent impact resistance and excellent elongation with the film in the present invention. Especially, the first rubber particle is effective to provide the excellent impact resistance, while the second rubber particle is effective to provide the excellent elongation.

The average particle diameters of the first and second rubber particles may be controlled to be proper values by adjusting the kind and the amount of a polymerization initiator and the period of time for the polymerization.

The average particle diameters of the first and second rubber particles are measured respectively, for example, by a method in which the rubber particles are mixed with a methacrylic resin, the resulting mixture was formed to a film thereof, the rubber particles dispersed in the film are dyed with ruthenium oxide in a cross-section of the film and at least ten (preferably 100 or more) dyed particles in the cross-section are observed with an electron microscope to obtain outer-layer diameters of the dyed particles and then the average particle diameter of the particles is calculated from the thus obtained outer-layer diameters, the average diameter being used in the present invention as the average particle diameter of the first or second rubber particles.

The total amounts of the elastic copolymers, which are contained in the first and second rubber particles, is preferably 5 parts by weight to 35 parts by weight and is more preferably 10 parts by weight to 25 parts by weight, based on 100 parts by weight of the total amounts of the methacrylic resin and the first and second rubber particles. When the total amount of the elastic copolymers is 5 parts by weight or more based on 100 parts by weight of the total amount of the methacrylic resin and the two types of rubber particles, film formability may be improved without making the resulting film fragile. Meanwhile, when the total amount of the elastic copolymers exceeds 35 parts by weight based on 100 parts by weight of the total of the methacrylic resin and two types of rubber particles, transparency and surface hardness of the resulting film tend to be decreased.

An acrylic resin film in the present invention may contain common additives such as an ultraviolet absorbent, an organic dye, an inorganic dye, a pigment, an anti-oxidation agent, an anti-electrostatic agent and a surfactant. Among them, an ultraviolet absorbent is preferably utilized, since the ultraviolet absorbent provides a molded article comprising the resulting film with excellent weathering resistance for a long period of time. Examples of the ultraviolet absorbent include a benztriazole-based UV absorbent, a 2-hydroxybenzophenone-based UV absorbent, a salicylic acid phenyl ester-based UV absorbent and the like. Examples of the benztriazole-based UV absorbent include 2,2'-methylenebis[4-(1,1,3,3-tetramethylbutyl)-6-(2H-benzotriazol-2-yl)phenol], 2-(5-methyl-2-hydroxyphenyl) benztriazole, 2-[2-hydroxy-3,5-bis(α,α-dimethylbenzyl) phenyl]-2H-benzotriazole, 2-(3,5-di-tert-butyl-2-hydroxylphenyl)benztriazole, 2-(3-tert-butyl-5-methyl-2-hydroxyphenyl)-5-chlorobenzotriazole, 2-(3,5-di-tert-butyl-2-hydroxyphenyl)-5-chlorobenzotriazole, 2-(3,5-di-tert-amyl-2-hydroxylphenyl)benztriazole, 2-(2'-hydroxy-5'-tert-octylphenyl)benztriazole and the like. Examples of the 2-hydroxybenzophenone-based UV absorbent include 2-hyedroxy-4-methoxybenzophenone, 2-hydroxy-4-octoxybenzophenone, 2,4-dihydroxybenzophenone, 2-hydroxy-4-methoxy-4'-chlorobenzophenone, 2,2'-dihydroxy-4-methoxybenzophenone, 2,2'-dihydroxy-4,4'-dimethoxybenzophenone and the like. Examples of the salicylic acid phenyl ester-based UV absorbent include p-tert-butylphenyl salicylate, p-octylphenyl salicylate and the like.

The above-described UV absorbent may be used solely or in the form of admixture of two or more of them. When a UV absorbent is utilized, the amount of the UV absorbent to be used may be 0.1 part by weight or more, preferably 0.3 part by weight or more, and may be 2 parts by weight or less, based on 100 parts by weight of the total methacrylic resin and two types of the rubber particles.

An acrylic resin film in the present invention can be obtained by forming a film form a mixture containing the above-described methacrylic resin and first and second rubber particles. The film may be formed in any of melt extrusion methods such as a melt spreading method, a T-shaped film die method, an inflation method and the like; calender methods; and the like. In terms of the improvement of surface smoothness and surface luster of the resulting film, it is preferred to form a film so that both surfaces of a film-like material which has been obtained by melt extrusion molding a mixture containing the methacrylic resin and the first and second rubber particles are simultaneously brought into contact with surfaces of rolls or belts. The rolls or belts to be employed are preferably made of metal.

The thickness of acrylic resin film in the present invention may be about 500 $\mu$m or thinner. When the thickness is thicker than about 500 $\mu$m, the film tends to have high rigidity, and laminating property, handling property and secondary processibility of the film may be decreased, resulting in difficulty in use as a film. In addition, a cost for the film per unit surface area thereof tends to increase, having disadvantages in economical point of view. Further, stable production of the film becomes relatively difficult. The thickness of the film is preferably in the range of from 50 μm to 300 μm, and is more preferably in the range of from 75 μm to 200 μm. When the thickness of the film is 50 μm or more, sufficient color depth is provided in appearance of a molded article having the film as the outermost layer.

An acrylic resin film in the present invention may be colored. The coloring is not particularly limited and may be carried out by a method in which a pigment or a dye is added to a mixture of the methacrylic resin and the two types of rubber particles to dye the resin itself before film formation; a method in which a acrylic resin film is immersed in a solution of a dye to dye the film; or the like. When an acrylic resin film is colored, it is preferred to employ selective coloration for designed patterns to be printed later on the surface of the acrylic resin film depending on the color of printing, which is effective to omit the printing for the designed patterns with the same colors.

Onto at least one surface of an acrylic resin film (which may have been colored as described above) in the present invention, printing of drawing patterns may be provided. The printing is preferably carried out on the side to be brought into contact with a thermoplastic resin placed on the film later so that printed patterns with color depth can be obtained.

Onto at least one side of surfaces of an acrylic resin film (which may have been colored as described above) in the present invention, at least one layer of a thermoplastic resin maybe placed, to provide a laminate film in the present invention.

The laminate film may be produced by a method in which a preliminary molded acrylic resin film in the present invention and a preliminary molded thermoplastic resin film are separately prepared and then such preliminary molded films are continuously laminated onto each other between heated rolls; a method in which the preliminary molded films are bonded by a press with heat, a method in which molding and laminating are conducted simultaneously in compressed air or in vacuum; a method in which the preliminary molded films are laminated onto each other with an adhesive layer therebetween (a wet lamination method); a method in which an acrylic resin material in the present invention is preliminary molded to be a sheet-like or film-like substrate thereof and a thermoplastic resin, which is melt-extruded from a T-shaped film die, is laminated on the sheet-like or film-like substrate; and the like. In such methods, the acrylic resin film may be subjected to, for example, corona treatment on the side of the surfaces to which the thermoplastic resin film will be placed, or may have an adhesive layer on the side.

Examples of the thermoplastic resin suitable for the lamination on the acrylic resin film in the present invention include a polycarbonate resin, a polyethylene terephthalate resin, a polyethylene resin, a polypropylene resin, a polystyrene resin, a polyvinyl chloride resin, an acrylic resin, a methacrylic resin, an ABS (acrylonitrile-butadiene-styrene copolymer) resin and the like.

An acrylic resin film (which may have been colored as described above) and a laminate film in the present invention are both preferably used as films for a simultaneous injection molding and lamination method and, for example, are integrally molded with a thermoplastic resin to make the outermost layer of the resulting molded article.

Such an integrally molding method is not particularly limited, and may be a method called as a simultaneous injection molding and lamination method as described above. Specifically, the simultaneous injection molding and lamination method may be a method comprising the steps of inserting an acrylic resin film (which may have been colored as described above) or a laminate film in the present invention between a male and a female dies for injection molding and injecting a melting resin from one side of the dies so as to form an injection molded article and paste the resin film or the laminate film simultaneously onto the molded article; a method comprising the steps of preliminarily molding an acrylic resin film (which may have been colored as described above) or a laminate film in the present invention by vacuum molding or the like and then inserting the preliminarily molded film or laminate film into an injection molding die, or of preliminarily molding an acrylic resin film (which may have been colored as described above) or a laminate film in the present invention by vacuum molding, compressed air molding or the like in an injection molding die, and then injecting a melting resin to the die so as to integrally mold the preliminarily molded film or laminated film with the resin. The latter method, that is, a method comprising the steps of preliminarily molding a film or a laminate film and then injecting a melting resin onto one surface of the film or the laminated film, is also called an insert molding method. Such simultaneous injection molding and lamination methods can be conducted in accordance with, for example, Japanese Patent Application Publication (JP-B) No. 63-6339, JP-B No. 4-9647, Japanese Patent Application Laid-Open (JP-A) No. 7-9484 and the like. When a laminate film is utilized in the above-described simultaneous injection molding and lamination method, the laminate film is preferably placed so that the thermoplastic resin layer in the laminate film faces the resin supplied in the injection molding, that is, the acrylic resin film in the laminated film is so arranged as to make the outermost surface of the resulting molded article.

The molded article obtained in such a manner, which has an acrylic resin film in the present invention as the outermost layer thereof, and an acrylic resin film (which may have been colored as described above) and a laminate film in the present invention, are all excellent in color depth, surface hardness and surface smoothness, and prevent its surface from having white turbidity even if being heated in molding and maintains excellent design properties.

According to the present invention, an acrylic resin film suitable for the outermost layer of an injection molded article can be provided. The acrylic resin film has little white turbidity in the heating at the time of molding and can maintain excellent design properties. A injection molded article having the acrylic resin film integrally placed as the outermost layer is excellent in design properties such as color depth.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2001-381111 filed on Dec. 14, 2001 indicating specification, claims and summary, are incorporated herein by reference in their entirety.

EXAMPLES

The present invention is described in more detail by following Examples, which should not be construed as a limitation upon the scope of the present invention. In Examples, % and parts showing concentration or amount to be used are based on weight, unless otherwise mentioned.

The average particle diameter of rubber particles was measured as follows.

[Measurement of Average Particle Diameter of Rubber Particles]

Rubber particles to be measured are mixed with a methacrylic resin, and the resulting mixture are formed to be a film. A sample piece having suitable size for the measurement is cut out from the film and is immersed in an aqueous solution of 0.5% ruthenium tetraoxide at a room temperature for 15 hours to dye rubber portions of the particles. Using a microtome, the sample piece is cut so as to have a thickness of about 80 nm and then is photographed by an transmission electron microscope. Dyed rubber particle portions in number of 100 are selected at random from the taken photograph, and the particle diameter of the respective particle portions selected are measured. Using such measured diameters, the average diameter of dyed particles is calculated and is used as an average diameter of the measured rubber particles.

Example 1

A pellet (having a glass transition temperature of 103° C.) of a resin obtained by bulk polymerization of monomers containing 97.8% of methyl methacrylate and 2.2% of methyl acrylate was used as a methacrylic resin. First rubber particles were produced in accordance with Example 3 in JP-B No. 55-27576 (=U.S. Pat. No. 3,793,402). The first rubber particles have an average particle diameter of 0.22 $\mu$m and a spherical three-layer structure composed of (i) the innermost layer of a cross-linked polymer formed by polymerization of methyl methacrylate with a small amount of allyl methacrylate, (ii) an intermediate layer of a soft elastic copolymer formed by polymerization of butyl acrylate as a main component, styrene and a small amount of allyl methacrylate and (iii) the outermost layer of a hard polymer formed by polymerization of methyl methacrylate with a small amount of ethyl acrylate. Rubber particles having the same spherical three-layer structure with the same composition as those of the first rubber particles except for having an average particle diameter of 0.16 $\mu$m, which had been controlled by changing the polymerization conditions, were used as second rubber particles. In both of the first rubber particles and the second rubber particles, the elastic copolymers in the intermediate layers are contained in amounts of 66.6% based on the entire rubber particles.

The above-mentioned methacrylic resin pellet (70 parts), the first rubber particle (12 parts) and the second rubber particle (18 parts) were mixed by a supermixer, and were melted and kneaded by a twin screw extruder, to obtain a pellet. Then, the pellet was extruded through a T-shaped film die at a set temperature of 275° C. using a single screw extruder apparatus with 65 mm $\phi$ manufactured by Toshiba Machinery Co., Ltd., followed by being cooled so that both surfaces of the resulting extruded film was completely brought into contact with polishing rolls, to obtain an acrylic resin film with a thickness of 0.13 mm. In the film, the total amount of the elastic copolymers in the first and second rubber particles is 20%. The film was subjected to the following tests (i.e., heating test and flexibility test). The results of the tests are shown in Table 1.

[Heating Test]

A film to be tested is heated in a thermostat with a temperature of 160° C. for 10 minutes, and haze values of the film are measured before and after the heating, the value being used as an index of whitening degree of the film. The haze measurement is carried out in accordance with JIS K Y105-1981, "Method for testing optical characteristics of plastics". That is, difference $\Delta H$ (=$H_2$-$H_1$) of the haze values before and after the heating is calculated from haze value $H_1$ (which is a haze value of the film before the heating) and haze value $H_2$ (which is a haze value of the film after the heating). The larger difference $\Delta H$ means that the film has the larger white turbidity by the heating. Further, the film after the heating test is observed with eyes. The results of the observation are shown in a way that symbol O is assigned when the film has good design property after the heating, while symbol X is assigned when the film has poor design property after the heating.

[Flexibility Test]

In accordance with JIS K 5400-1990, "General method for testing coating agent", (specifically, "8. Method for testing resistibility of coating agent", "8.1 Flexibility", the flexibility of a film is evaluated. The results of the observation are shown in a way that symbol O is assigned when the film has good flexibility, while symbol X is assigned when the film is ruptured and lacked in flexibility.

Example 2

A 0.13 mm thick acrylic resin film was produced in the same manner as in Example 1, except that the amount of the first rubber particles and the amount of the second rubber particles were changed to be 6 parts and 24 parts, respectively, from those in Example 1. In the film, the total content of the elastic copolymer in the first and second rubber particles in the second rubber particles is 20%. The obtained film was subjected to the same tests as those conducted in Example 1. The results of the tests are shown in Table 1.

Example 3

A 0.3 mm thick acrylic resin film was produced by repeating the same steps as in Example 1, except that the outlet thickness of the T-shaped film die and the gap between the polishing rolls were adjusted so as to obtain the 0.3 mm film. The obtained film was subjected to the same tests as those conducted in Example 1. The results of the tests are shown in Table 1.

Example 4

A 0.13 mm thick acrylic resin film was produced in the same manner as in Example 1, except that the first and second rubber particles used in Example 1 were changed to first and second rubber particles having the same spherical three-layer structures with the same compositions as the first and second rubber particles in Example 1 but having an average particle diameter of 0.25 $\mu$m and 0.14 $\mu$m, respectively, which had been controlled by changing the polymerization conditions. Both of the first and second rubber particles employed in this Example contain 66.6% of elastic copolymers as the intermediate layers based on the respective entire rubber particles. Accordingly, in the obtained film, the total amount of the elastic copolymers in the first and second rubber particles is 20%. The obtained film was subjected to the same tests as those conducted in Example 1. The results of the tests are shown in Table 1.

Comparative Example 1

A 0.13 mm thick acrylic resin film was produced in the same manner as in Example 1, except that the amounts of the first and second rubber particles were changed to be 1 part and 29 parts, respectively, from those in Example 1. In the film, the total amount of the elastic copolymers in the first and second rubber particles is 20%. The obtained film was subjected to the same tests as those conducted in Example 1.

The results of the tests are shown in Table 1.

Comparative Example 2

A 0.13 mm thick acrylic resin film was produced in the same manner as in Example 1, except that the amounts of the first and second rubber particles were changed to be 28 parts and 2 parts, respectively, from those in Example 1. In the film, the total amount of the elastic copolymers in the first and second rubber particles is 20%. The obtained film was subjected to the same tests as those conducted in Example 1. The results of the tests are shown in Table 1.

Comparative Example 3

A 0.13 mm thick acrylic resin film was produced in the same manner as in Example 1, except that (i) the first rubber particles used in Example 1 were changed to first rubber particles having the same spherical three-layer structure with the same composition as the first rubber particles used in Example 1 but having an average particle diameter of 0.25 μm, which had been controlled by changing the polymerization conditions, and (ii) the second rubber particles used in Example 1 were changed to rubber particles having an average particle diameter of 0.22 μm, which were used as the first rubber particles in Example 1. The first rubber particles employed in this Example also contains 66.6% of the elastic copolymers as the intermediate layer based on the first rubber particles. Accordingly, in the obtained film, the total amount of the elastic copolymers in the first and rubber particles is 20%. The obtained film was subjected to the same tests as those conducted in Example 1. The results of the tests are shown in Table 1.

[Design Property Evaluation]

Design property of a laminate film and a molded article is evaluated by eye observation. The results of the observation are shown in a way that symbol O is assigned when the film shows good design properties after the heating, while symbol X is assigned when the film has poor design property, while symbol X is assigned when the film has poor design property. The design property here corresponds to general and synthetic judgment based on surface luster, color depth of the lower layer printing and the like.

[Heat Resistance Test]

A laminate film and a molded article to be tested is placed in a thermostat at a temperature of 160° C. for 10 minutes, and the surface appearance of the film/article after the heating is observed with eyes. The results of the observation are shown in a way that symbol O is assigned when the film/article has little white turbidity in its surface after the heating and has good surface appearance, while symbol X is assigned when the film/article film has large white turbidity in its surface after the heating.

Example 6

A 0.13 mm thick acrylic resin film produced in accordance with Example 1, onto which a printed film had been laminated, was placed with in an injection mold in a manner that the acrylic resin film was pushed against the mold, and then ABS resin in 3 mm thickness was injected to the rear surface on the film (that is the side on which the printed film had been laminated) thereto, to obtain a molded article. In the injection molding, the temperature of the acrylic resin film was 130° C., the temperature of the mold was 50° C., the injection molding pressure was 1,150 kg/cm$^2$, and the temperature of the ABS resin was 230° C. The obtained

TABLE 1

| | Amount of acrylic type resin | First rubber particles Amount/ Particle diameter | Second rubber particles Amount/ Particle diameter | Thickness | Heating test Haze | Eye observation | Flexibility |
|---|---|---|---|---|---|---|---|
| Example | | | | | | | |
| 1 | 70 parts | 12 parts/ 0.22 μm | 18 parts/ 0.16 μm | 0.13 mm | 0.3% | 0 | 0 |
| 2 | 70 parts | 6 parts/ 0.22 μm | 24 parts/ 0.16 μm | 0.13 mm | 0.1% | 0 | 0 |
| 3 | 70 parts | 12 parts/ 0.22 μm | 18 parts/ 0.16 μm | 0.3 mm | 0.3% | 0 | 0 |
| 4 | 70 parts | 12 parts/ 0.25 μm | 18 parts/ 0.14 μm | 0.13 mm | 0.4% | 0 | 0 |
| Comparative Example | | | | | | | |
| 1 | 70 parts | 1 part/ 0.22 μm | 29 parts/ 0.16 μm | 0.13 mm | 0.1% | 0 | X |
| 2 | 70 parts | 28 parts/ 0.22 μm | 2 parts/ 0.16 μm | 0.13 mm | 1.4% | X | 0 |
| 3 | 70 parts | 12 parts/ 0.25 μm | 18 parts/ 0.22 μm | 0.13 mm | 1.2% | X | 0 |

Example 5

A laminate film was produced by overlaying a 0.13 mm thick acrylic resin film produced in the same manner as in Example 1 on a 0.3 mm thick ABS resin film, while a printed film being placed between them, and pasting the films by heating pressing. The obtained laminate film was evaluated in accordance with the following methods. The results are shown in Table 2.

molded article was evaluated in the same ways as in Example 5. The results are shown in Table 2.

Comparative Example 4

A 0.13 mm thick acrylic resin film produced in accordance with Comparative Example 2, onto which a printed film had been laminated, was placed with in an injection mold in a manner that the acrylic resin film was pushed against the mold, and then ABS resin in 3 mm thickness was injected to the rear surface on the film (that is the side on which the printed film had been laminated) thereto, to obtain a molded article. In the injection molding, the temperature of the acrylic resin film was 130° C., the temperature of the mold was 50° C., the injection molding pressure was 1,150 kg/cm$^2$, and the temperature of the ABS resin was 230° C. The obtained molded article was evaluated in the same ways as in Example 5. The results are shown in Table 2.

TABLE 2

|  |  | Design property evaluation | Heat resistance test |
|---|---|---|---|
| Example 5 | Laminate film | ○ | ○ |
| Example 6 | Injection molded article | ○ | ○ |
| Comparative Example 4 | Injection molded article | X | X |

What is claimed is:

1. An acrylic resin film having a thickness of 500 μm or thinner and comprising 50 parts by weight to 95 parts by weight of a methacrylic resin as a mother phase, 2.5 parts by weight to 20 parts by weight of a first rubber particle with an average particle diameter of 0.2 μm to 0.4 μm and 2.5 parts by weight to 30 parts by weight of a second rubber particle with an average particle diameter of 0.12 μm to 0.18 μm, both particles being dispersed in the mother phase.

2. An acrylic resin film according to claim 1, wherein the methacrylic resin is a methacrylic resin which is obtainable by polymerization of monomers comprising 50% by weight to 100% by weight of a methacrylic acid alkyl ester having alkyl group with 1 to 4 carbons, 0 to 50% by weight of an acrylic acid ester and 0 to 49% by weight of at least one of other vinyl monomers co-polymerizable with the methacrylic acid alkyl ester and the acrylic acid ester.

3. An acrylic resin film according to claim 2, wherein the methacrylic resin has a glass transition temperature of 40° C. or higher.

4. An acrylic resin film according to claim 1, wherein the first and second rubber particles are rubber particles which are respectively obtainable by a method comprising the steps of:

(i) polymerizing monomers consisting of 50% by weight to 99.9% by weight of acrylic acid alkyl ester, 0 to 49.9% by weight of at least one of other vinyl monomers copolymerizable with the acrylic acid alkyl ester and 0.1% by weight to 10% by weight of a copolymerizable cross-linking monomer to obtain an elastic copolymer; and (ii) polymerizing 10 parts by weight to 400 parts by weight of monomers consisting of 50% by weight to 100% by weight of a methacrylic acid ester, 0 to 50% by weight of an acrylic acid ester and 0 to 49% by weight of at least one of other vinyl monomers copolymerizable with the methacrylic acid ester and the acrylic acid ester in the presence of 100 parts by weight of the elastic copolymer so that at least one layer obtained from the latter polymerization is bonded with the surface of the elastic copolymer.

5. An acrylic resin film according to claim 4, wherein the elastic copolymer is contained in the first and second rubber particles in the total amounts of 5 parts by weight to 35 parts by weight based on 100 parts by weight of the total amounts of the methacrylic resin and the first and second rubber particles.

6. An acrylic resin film according to claim 1, wherein the methacrylic resin is a methacrylic resin which is obtainable by polymerization of monomers comprising 50% by weight to 100% by weight of a methacrylic acid alkyl ester having alkyl group with 1 to 4 carbons, 0 to 50% by weight of an acrylic acid ester and 0 to 49 % by weight of at least one of other vinyl monomers co-polymerizable with the methacrylic acid alkyl ester and the acrylic acid ester, the methacrylic resin having a glass transition temperature of 40° C. or higher;

the first and second rubber particles are rubber particles which are respectively obtainable by a method comprising the steps of:

(i) polymerizing monomers consisting of 50% by weight to 99.9% by weight of acrylic acid alkyl ester, 0 to 49.9% by weight of at least one of other vinyl monomers copolymerizable with the acrylic acid alkyl ester and 0.1% by weight to 10% by weight of a copolymerizable cross-linking monomer to obtain an elastic copolymer; and (ii) polymerizing 10 parts by weight to 400 parts by weight of monomers consisting of 50% by weight to 100% by weight of a methacrylic acid ester, 0 to 50% by weight of an acrylic acid ester and 0 to 49% by weight of at least one of other vinyl monomers copolymerizable with the methacrylic acid ester and the acrylic acid ester in the presence of 100 parts by weight of the elastic copolymer so that at least one layer obtained from the latter polymerization is bonded with the surface of the elastic copolymer; and the elastic copolymer is contained in the first and second rubber particles in the total amounts of 5 parts by weight to 35 parts by weight based on 100 parts by weight of the total amounts of the methacrylic resin and the first and second rubber particles.

7. An acrylic resin film according to any one of claims 1 to 6, wherein the acrylic resin film is a film obtained by a method comprising the steps of mixing the first and second rubber particles with the methacrylic resin to obtain a mixture thereof, conducting a melt extrusion molding of the mixture to obtain a film-like material of the mixture and forming a film so that both surfaces of the film-like material are simultaneously brought into contact with surfaces of rolls or belts.

8. An acrylic resin film according to any one of claims 1 to 6, wherein the acrylic resin film is a colored film.

9. A laminate film comprising the acrylic resin film as claimed in any one of claims 1 to 6 and at least one layer of thermoplastic resin placed on at least one surface of the acrylic resin film.

10. A film for simultaneous injection molding and lamination, the film comprising an acrylic resin film as claimed in any one of claims 1 to 6.

11. A laminate film according to claim 9, wherein the laminate film is for simultaneous injection molding and lamination.

12. An injection molded article comprising an acrylic resin film as claimed in any one of claims 1 to 6 and a thermoplastic resin layer, wherein the film is united with the surface of the thermoplastic resin layer in an injection molding.

13. An injection molded article comprising an laminate film as claimed in claim 9 and an thermoplastic resin layer, wherein the laminate film is united with the surface of the thermoplastic resin layer so that the acrylic resin film as claimed in any one of claims 1 to 6 is placed as the outer surface layer of the molded article.

* * * * *